United States Patent [19]

Focarile et al.

[11] Patent Number: 5,434,854
[45] Date of Patent: Jul. 18, 1995

[54] SYSTEM FOR COMMUNICATING DIGITAL CELLULAR DATA BETWEEN A CELL SITE AND A SWITCHING SYSTEM OR ANOTHER CELL SITE

[75] Inventors: Joseph P. Focarile, Gladstone, N.J.; Jayant G. Hemmady, Naperville, Ill.; Ronald A. Spanke, Wheaton, Ill.; Hsien-Chuen Yu, Naperville, Ill.

[73] Assignee: AT&T Corp., Murray Hill, N.J.

[21] Appl. No.: 174,482

[22] Filed: Dec. 27, 1993

[51] Int. Cl.6 .............................................. H04J 3/24
[52] U.S. Cl. .................... 370/60.1; 379/60; 455/33.1
[58] Field of Search ............... 370/94.1, 60, 60.1, 370/95.1, 95.3, 85.13, 110.1; 379/91, 92, 93, 94, 96, 58, 59, 60; 455/33.1–33.4

[56] References Cited

U.S. PATENT DOCUMENTS

| | | | |
|---|---|---|---|
| 4,777,646 | 10/1988 | Harris | 379/91 |
| 4,887,265 | 12/1989 | Felix | 370/94.1 |
| 4,905,231 | 2/1990 | Leung et al. | 370/94.1 |
| 4,975,906 | 12/1990 | Takiyasu et al. | 370/85.13 |
| 5,136,584 | 8/1992 | Hedlund | 370/94.1 |
| 5,144,622 | 9/1992 | Takiyasu et al. | 370/85.13 |
| 5,168,498 | 12/1992 | Adams et al. | 370/95.1 |
| 5,184,347 | 2/1993 | Farwell et al. | 370/94.1 |
| 5,249,181 | 9/1993 | Wang et al. | 370/60 |

*Primary Examiner*—Douglas W. Olms
*Assistant Examiner*—Dang Ton
*Attorney, Agent, or Firm*—Michael B. Johannesen

[57] ABSTRACT

A system and method for delivering packetized data representing radio signals to and from cell sites, and to and from a destination point via a fast packet network. Each cell site includes an interface for packetizing the radio signals and transmitting the packetized data to its destination. The destination could be a delivery point at a switch connected to the telephone network, which then converts the packetized data into a form usable by the telephone network. Alternatively, the destination point could be another cell site, which then depacketizes the radio signal and retransmits the radio signal to another wireless communication device without connecting to the telephone network.

14 Claims, 5 Drawing Sheets

SYSTEM FOR COMMUNICATING DIGITAL CELLULAR DATA BETWEEN A CELL SITE AND A SWITCHING SYSTEM OR ANOTHER CELL SITE

CROSS-REFERENCE TO RELATED APPLICATION

This application is related to U.S. patent application Ser. No. 08/174,481, entitled "System and Method for Providing Soft Handoff of a Cellular Mobile-To-Mobile Call," filed concurrently with this application.

TECHNICAL FIELD

This invention relates to the field of packet switching, and more specifically, to providing code division, multiple access cellular service between a cell site and a switch, and between a cell site and another cell site.

BACKGROUND OF THE INVENTION

Code division, multiple access (CDMA) cellular communications provides 10-20 times the call handling capacity of analog cellular communications systems. See, e.g., "An Overview Of The Application Of Code Division Multiple Access (CDMA) To Digital Cellular Systems And Personal Cellular Networks," May 21, 1992, available from Qualcomm, Inc.—10555 Sorrento Valley Road—San Diego, Calif. A CDMA system transmits/receives voice or data at the relatively slow rate of approximately 8 Kbps to/from a mobile unit over a spread spectrum signal. (Other rates may be supported e.g. 16 Kbps, but the rate is below the connection-based telephone industry standard rate of 64 Kbps). A transceiver at the cell site sends/receives the spread spectrum signal and translates it from/into CDMA data packets. A speech handler translates the data packets into and out of digital 64 Kbps pulse code modulated (PCM) stream, as used in standard connection-based digital switching. (CDMA cellular communications is more fully described in Qualcomm, Inc., "The Wideband Spread Spectrum Digital Cellular System Dual Mode Mobile Station-Based Station Compatibility Standard," and Qualcomm, Inc., "CDMA Digital Common Error Interface Standard," revision 1.0, October, 1993). In most CDMA system designs, the speech handler is at the cell site. A 64 Kbps circuit-switched connection is then made for transmitting and receiving CDMA data packets between the cell site through the serving switch and the public switch telephone network (PSTN).

A problem associated with this system (and common to all cellular systems with circuit-switched connections between the cell site and the switch) is that, as the mobile moves from cell to cell, the circuit connection between the cell site and the switch must be torn down and re-established to the new cell site. Tearing down and re-establishing a circuit connection as a mobile moves from cell to cell and from switch to switch is known in the art as a "hard handoff." Hard handoffs are perceivable by the user as noticeable clicks and/or pauses in service. It is desirable in the art to provide "soft handoffs," or handoffs from cell to cell and from switch to switch that are not perceptible to the user.

One solution to the problem of hard handoff is found in U.S. Pat. No. 5,184,347, which issued to AT&T in the name of Farwell, et al. (herein "Farwell"). Farwell provides a system that delivers CDMA packets from a cell site to a speech handler. Each cell site is connected to a cell-interconnect module which consists of a DS1 interface unit, a local area network bus, and a packet processing network. The content (voice or data) of the spread spectrum radio signal from the mobile unit is first packetized at the cell site. Packets are then addressed for the packet processing network and transmitted from the cell site over a DS1 link to the DS1 interface unit. This DS1 interface unit delivers the packets to the local area network bus, which is connected to a packet processing element. The packet processing element includes a table for translating a packet processing element address into a speech handler address. The packet is then sent to a optic fiber interface and over the optic fiber to an expansion interface. The expansion interface places the packet on another local area network. The packet is then picked up by a speech processing unit from the local area network.

Soft handoffs are initiated in the system of the Farwell patent by the mobile determining that it is in range of a second cell site. A handoff request message is sent from the mobile to the mobile switching complex, designating the second cell site as the new cell site. A new path is then set up through the switch complex to the speech handler by first selecting a route from the new cell site to the existing speech handler, and then informing each element along the route of the new connection. Each element then populates its lookup table with the appropriate call data to route the call to the next element, and eventually to the speech handler. The speech handler then receives two packets containing nearly identical data, and selects the one with a stronger signal strength (included as part of the data in the packet). Thus, the same speech handler is used for both cells, and a hard handoff is avoided. This system is complex in hardware and requires some time to establish and tear down each path through the system, because of the time necessary to populate all of the look-up tables.

A second solution to the problem of hard handoffs is found in U.S. patent application Ser. No. 08/040,819, filed Mar. 31, 1993, in the name of Hemmady, et al. (herein "Hemmady"). Hemmady provides a system for relaying packets between a cell site transceiver and a destination PSTN interface, via a self-routing, packet-switched mechanism. Packets from the cell site include a unique routing address of the destination PSTN interface (speech handler) which is located in a switching office. The packets are constructed by the receiver at the cell site including the content of the spread spectrum radio signal and sent in a packet pipe to a packet switch in a host switching system. A packet handler at the packet switch receives the packets, demultiplexes the packet pipe and forwards the packets on a packet bus. The destination PSTN interface assigned to that call recognizes its own address in the packets on the packet bus and processes the packets. As the mobile moves from cell to cell, and from a cell connected to one switch to a new cell connected to another switch, the new cell site is informed of the address of the destination PSTN interface originally assigned to the call, and the new cell uses its own packet pipes to send the packets to the destination PSTN interface, using the same address. The destination PSTN interface during the period when a mobile is moving from one cell to another, receives packets from both cell sites and selects the best quality packet. This system does not require the circuit switched connections or updating tables, etc., of the Farwell disclosure. This system, however, requires expensive hardware for handling packets at each switch through which packets are sent.

Both of these systems require that the cell site is connected to a mobile telephone switching office (MTSO) that is local to the cell site. Each cell site must be connected by a trunk to an MTSO where the packets containing the call can be translated. These systems also require nailed-up packet pipes to the MTSO from the cell sites, digital facilities at the MTSO for receiving the packet pipes, a time slot interchange to direct the packet pipes to the packet switch unit and special boards to process and recover packets from the packet pipe and place the packets on a packet bus to their destination. All of this hardware is required prior to the CDMA packets arriving at the self-routing medium which make the above-cited system function superiorly to their respective prior art.

Furthermore, both of these systems select a speech handler or PSTN interface located in an office closest to the origination cell site receiving the mobile call. These speech handler converts the CDMA into a 64 Kbps rate to be switched through the PSTN. If the PSTN destination is across the country, then a 64 Kbps channel, and all of its associated cost, is required across the long distance network.

Neither of these two systems address calls from a first CDMA mobile system to a second CDMA mobile system. As stated above, CDMA digital packets are broadcast at a rate of 8 Kbps. When these packets arrive at a switch, they are translated by the speech handler into a 64 Kbps rate so that they may be handled by the switch. For a mobile-to-mobile call, the 64 Kbps packets must again be turned into 8 Kbps packets in order to be broadcast on the CDMA system. Every translation from one format to another degrades the quality of the encoded voice or other signals in the packet.

Therefore, a problem in the an is that there is no system which can directly transport cellular radio data to their destination, whether the destination is the PSTN or another cellular system, without adding additional hardware to the switch or adding multiple levels of translation of the data. A further problem in the art is that there is no system to transport 8 Kbps packets to a point close to the final destination before converting them into 64 Kbps packets.

SUMMARY OF THE INVENTION

This problem is solved and a technical advance is achieved in the art by a system and method for delivering packetized data representing radio signals to and from cell sites, and to and from a destination switching system via a fast packet network that repacketizes the packetized data for transport at a higher rate. Each cell site includes an interface for such repacketizing the data from the radio signals and transmitting the repacketized data to its destination. The destination could be a delivery point at a switch, which then converts the repacketized data into a form usable by the telephone network. Alternatively, the destination could be another cell site, which then depacketizes the data and retransmits the radio signal to another wireless communication device. Thus, mobile-to-mobile communications can be achieved without use of a switch. The data from each cell site retains its compressed voice character until convened at the switch or the receiving cell site, and, because of the fast packet network, may be transmitted to a single destination regardless of which cell site it's coming from.

Further, this invention provides for reduced operating cost by allowing the 8 Kbps compressed voice packets to be transmitted through the entire network and only converted to 64 Kbps at a switch close to the final destination, when that destination is a land based line. When the final destination is another mobile unit, no conversion the 64 Kbps is ever required. This improves the voice quality for mobile-to-mobile communication.

BRIEF DESCRIPTION OF THE DRAWING

A more complete understanding of the invention may be obtained from consideration of the following description in conjunction with the drawings in which.

DETAILED DESCRIPTION

Figure 1:
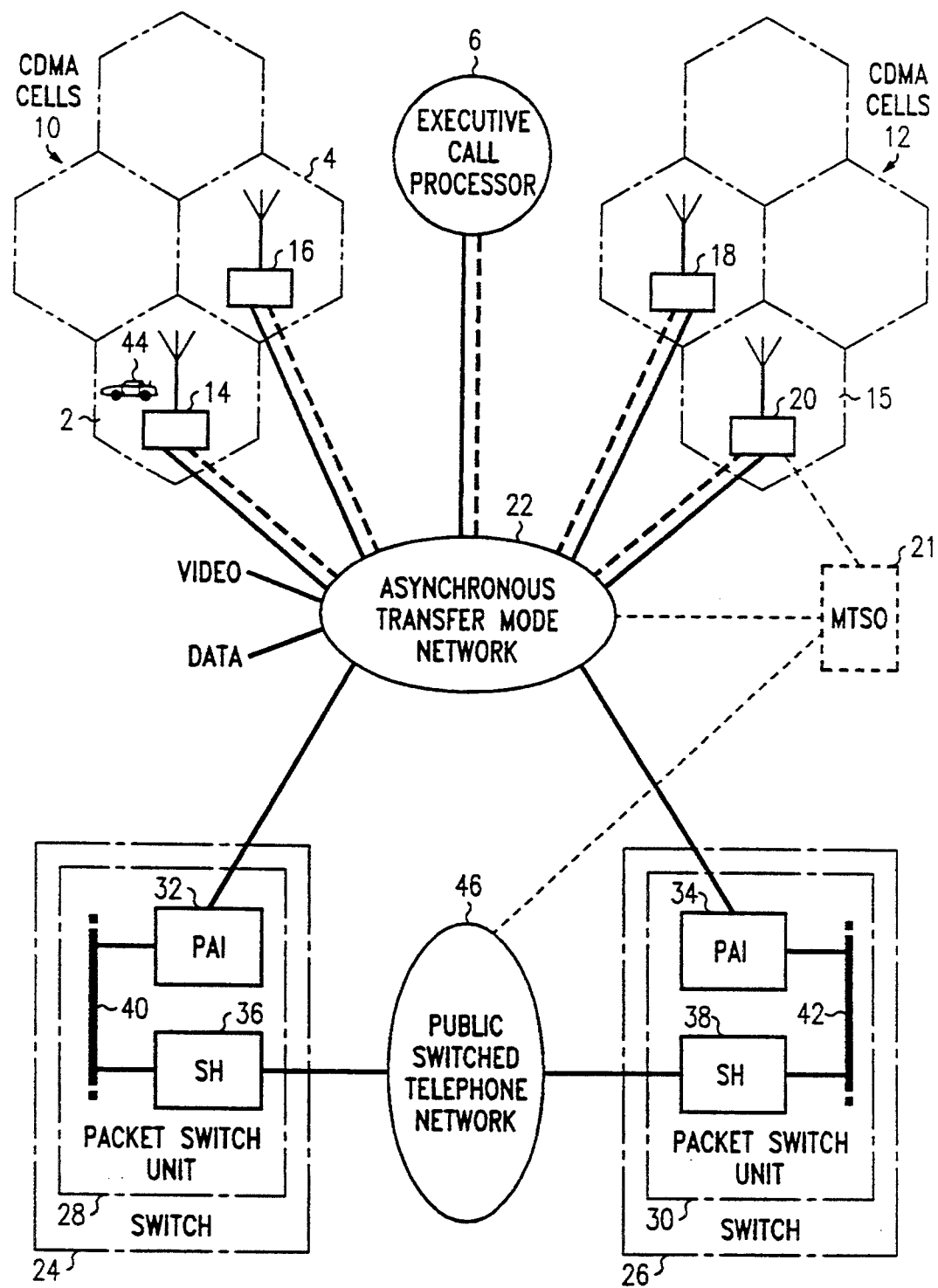
FIG. 1 is a block diagram of a plurality of mobile telephone switching systems, a public switch telephone network, and a packet switch (at a mobile telephone switching office) wherein the packet switch distributes CDMA packets to speech handlers or to other cell sites according to an exemplary embodiment of this invention.

An exemplary embodiment of a system for communicating digital cellular data between cell sites in a switching system or other cell sites is described herein, in the context of a mobile telephone switching system and a public-switched telephone network as illustrated in FIG. 1. FIG. 1 illustratively includes two CDMA cellular regions 10 and 12. These CDMA regions are illustrated as being separate, but may in fact be parts of one larger CDMA cellular system. Each CDMA cell includes a cell site, for example cell sites, 14–20. Cell sites 14–20 send and receive CDMA radio signals over the spread spectrum, as described above, to and from mobile telephones within their individual cells, and translate the communication contents of the radio signals in electronic data, which is then packetized. Each cell site 14–20 is in communication with executive call processor (ECP) 6 via data links (shown as dashed lines). ECP 6 keeps track of all calls in its associated cellular systems 10 and 12, as is known in the art and described in *The Bell System Technical Journal,* Vol. 58, No. 1, January, 1979. ECP 6 is shown connected to ATM network 22, but may also be a separately connected ECP network.

According to the teaching of the prior art, every cell is assigned to a mobile telephone switching office, to which it is connected by a hard line (e.g., a T1 trunk). FIG. 1 shows MTSO 21 connected to cell site 20 (shown in phantom). All communications to/from mobiles in cell 15 must pass through MTSO 21 according to the prior art. Further, MTSO 21 must include all of the facilities to PSTN 46 and/or ATM network 22, in order to distribute mobile calls to their destinations. MTSO 21 is therefore a special case of a switch with additional hardware necessary to terminate mobile calls from cell sites and distribute the calls.

In the exemplary embodiment of this invention, in contrast, cell sites 14–20 are connected to an asynchronous transfer mode (ATM) network 22. ATM network 22 is an example of a fast packet network according to this invention. As will be described below in connection with FIG. 3, cell sites include an ATM interface which repacketize the CDMA data packets and send them to their destination over ATM network 22. ATM network 22 is connected to a plurality of sources and destinations of packet traffic including video and data, as well as CDMA traffic from cells 14–20, according to this invention.

ATM network 22 is also connected to a plurality of telephone switching offices represented by switches 24 and 26. Switches 24 and 26 may serve both cellular and wire line traffic, as will be described below in connection with FIG. 2 and need not be special MTSO-type switches. Switches 24 and 26 are connected to public switched telephone network 46, ATM network 22 via packet switch units 28 and 30, and to PSTN 46.

Packet switch units (PSU) 28 and 30 according to an exemplary embodiment of this invention include packet access interface (PAI) units 32 and 34 and speech handlers 36 and 38, respectively. PAIs 32 and 34 and speech handlers 36 and 38 are connected to respective packet buses 40 and 42. Speech handlers are known in the art as "end points." Other end points performing similar (or dissimilar) functions may also be connected to the packet bus, but are not shown for clarity. A packet bus and its attached endpoints are called a "packet community." PAI 32 sends and receives ATM packets to and from ATM network 22 for data communicated by switch 24 through ATM network 22.

According to an exemplary embodiment of this invention, mobile telephone 44 initiates a call in cell 2 to a land-based telephone in PSTN 46. In this exemplary embodiment, there are one or more speech handlers connected to packet bus 40 in packet switch unit 28. A CDMA call is set up between mobile 44 and cell site 14. ECP 6 determines that the call is to a land line, and assigns a speech handler to the call that is close to the land line destination. Speech handler 36 (at switch 24, which is closest to the final PSTN destination) is assigned to the call and a unique two-part address and an ATM destination address is given to the cell site 14 that describes speech handler 36, as will be described below in connection with FIG. 3.

As CDMA signals arrive at cell site 14 (or other cell sites, such as 16) they are packetized and the two-pan address of the speech handler is added to it. The packets are then encapsulated (repacketized) with transport protocol data for transmission on ATM network 22. ATM network 22 reads the packet address and delivers the packet to the appropriate packet access interface, PAI 32 in this example. PAI 32 receives the packet from ATM network 22 and removes the packet data from the ATM payload. The packet data is then placed on packet bus 40. Speech handler 36 monitors bus 40 and sees that the packet is for it. Speech handler 36 then takes the packet off bus 40, translates the data into 64 Kbps PCM and transmits it into public-switched telephone network 46 to a land-based destination.

Figure 2:
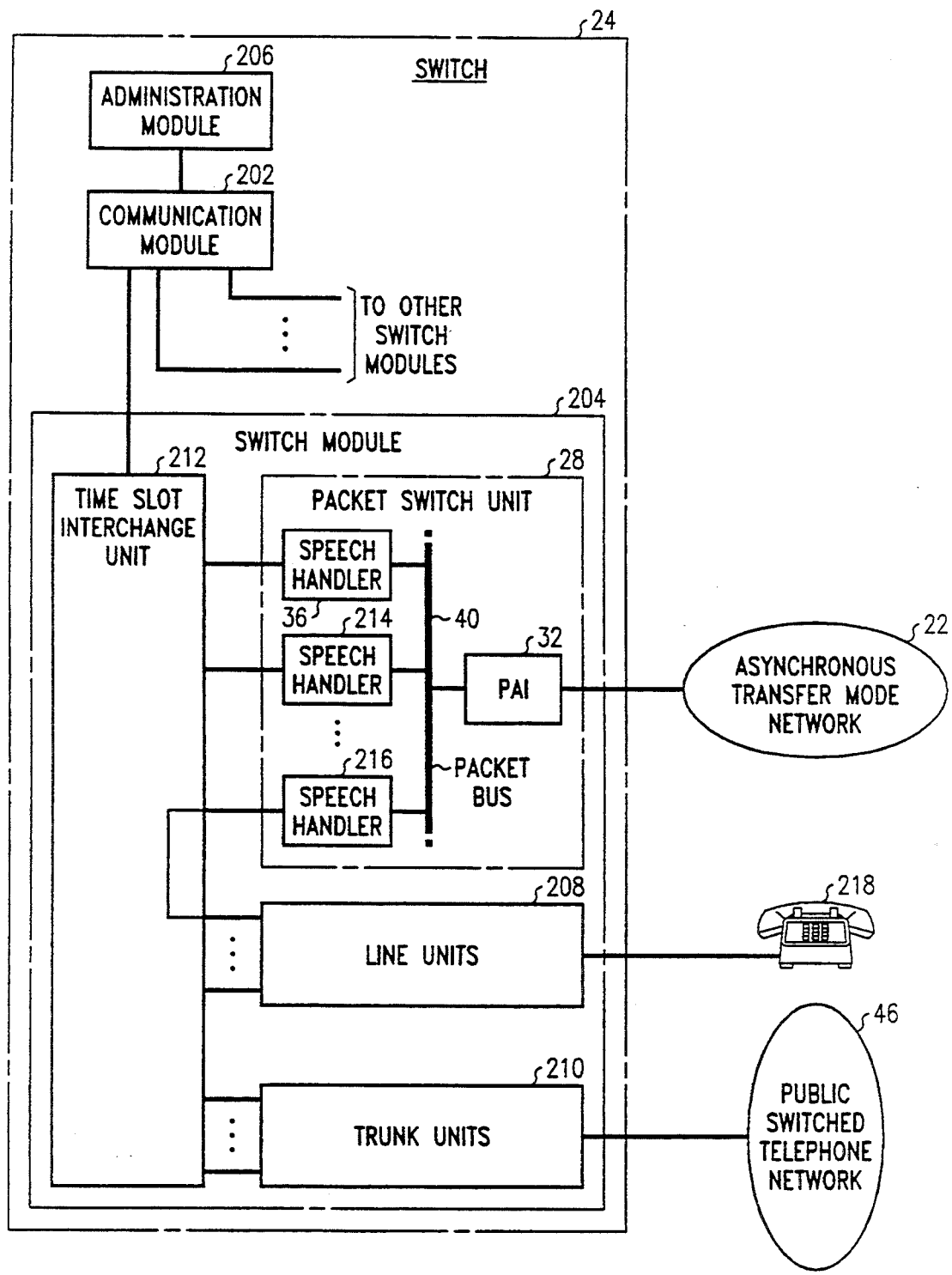
FIG. 2 is a block diagram of a mobile telephone switching office (MTSO) that acts as a destination point according to an exemplary embodiment of this invention.

Turning to FIG. 2, switch 24 is shown in more detail. Illustratively switch 24 is a distributed control, ISDN telephone system such as the system disclosed in U.S. Pat. No. 4,592,048, issued to M. W. Beckner et al. on May 27, 1986. Alternatively, switch 24 may be a distributed control digital switch such as a 5ESS® switch manufactured by AT&T and described in the *AT&T Technical Journal,* Vol. 64, No. 6, July/August 1985, pages 1303–1564. The architecture of each of the switch 24 includes communication module 202 as a hub, a switch module 204, other switch modules (not shown for clarity), and an administrative module 206 emanating therefrom. Switch module 204 terminates analog and/or digital subscriber lines through line units 208 and analog or digital trunk through trunk units 210. Trunk unit 210 provides communication with public-switched telephone network 46. Administrative module 206 provides coordination of functional components of switch 24 and human machine interface. Switch module 204 includes a timeslot interchange unit (TSIU) 212 and packet switch unit 28. TSIU 212 provides interchange of 64 Kbps PCM for 64 Kbps clear channel among the units in switch module 204. Switch module 204 may also contain other units, but for purposes of clarity, these other units are not shown.

To continue the example of FIG. 1, packets arrive from an ATM network 22 at PAI 32 where they are removed from the payload of the ATM cell. Packets are then reassembled (if necessary) into the full CDMA packet length and sent on packet bus 40. Speech handler 36 then recognizes the two part address that is addressed to itself and removes the packet from packet bus 40. Speech handler 36 processes the CDMA data packet into 64 Kbps PCM and sends the data to time slot interchange unit 212.

Packet switch unit 28 supports a number of speech handlers, including speech handlers 36, 214 and 216, for example, simultaneously. Speech handler 216 is shown having a connection through TSIU 212 to line unit 208 and to telephone 218. Any connection from the speech handlers can be made through TSIU 212 to line units such as 208 and to trunk unit 210. The only hardware addition to a standard digital switch are the speech handlers, thus effecting a great cost savings over MTSOs that are hard wired to cell sites.

Returning briefly to FIG. 1, soft handoffs may easily be achieved through use of this system. To continue the example from above, mobile 44 is connected via cell site 14 through ATM 22 to PAI 32 which then places packet data onto packet bus 40 through speech handler 36 into a telephone connected to public switch telephone network 46.

As mobile 44 moves into cell 4 which is served by cell site 16 it senses a pilot signal, as is known in the art, and requests a handoff. ECP 6 is notified and ECP 6 sends data regarding the call to cell site 16. This call data includes the destination address of PAI 32 and speech handler 36 so that cell site 16 may repacketize data and send the packetized data through ATM network 22 to PAI 32, and ultimately to speech handler 36. ECP 6 also informs speech handler 36 that it is to transmit data to both cells 14 and 16. At this point, cell sites 14 and 16 will both receive spread spectrum signal from mobile 44, packetize the data from the signal, repacketize the data into ATM cells and send such ATM cells on ATM network 22. PAI 32 will receive both packets containing identical (or nearly identical) data, remove the packets from the ATM cells and send reassembled CDMA packets on bus 40. Speech handler 36 then receives both packets and through use of a signal strength indication encoded in the CDMA packets, decides which packet to process and send to PSTN 46.

Information coming from PSTN 46 arriving at speech handler 36 is packetized into CDMA packets, replicated and addressed for both cell site 14 and 16 using the data sent from ECP 6. These packets are put on bus 40 received by PAI 32 repacketized into ATM cells and sent through ATM network 22 to cell sites 14 and 16. Cell sites 14 and 16 depacketize the CDMA packet data, translate the CDMA packet data into a spread spectrum signal and broadcast the data to mobile 44. Mobile 44 determines which packet contains a stronger signal strength indication and depacketizes that packet. Eventually, as mobile 44 moves into cell 4, the signal strength of cell site 14 will fall below a threshold. ECP 6 is notified, and ECP removes the destination 14 from speech handler 36 list and removes the call data from cell site 1,4. Through this system, a soft handoff may be achieved without tearing down and setting up a new connection through MTSO 28 or transferring a call from one switch to another. Thus, no user perceptible clicks or discontinuities are present.

Further, mobile 44 may be traveling across the country. Cell 2 may be, for example, in New Jersey and cell 15 may be, for example, in Illinois. Generally, fewer switching resources are used if the speech handler processing the call is closest to the destination of the call. For example, speech handler 36 at PSU 28 may be a portion of the same telephone office of the destination telephone. As mobile 44 moves from cellular system 10 to cellular system 12, for example, moving into cell 15 with cell site 20, mobile 44 would receive the pilot signal and initiate a call handoff as described above. Cell site 20 would contact ECP 6 for the destination packet information. Cell site 20 would then begin delivering repacketized data to ATM 22 which can transport packets across an urban area or across the country. These packets would then be delivered to PAI 32 and translated at speech handler 36 and delivered to the destination telephone in PSTN 46 as described above. Thus, this exemplary embodiment of this invention may be used for a "long-haul" cellular switching network to achieve reduced "long-haul" transportation costs.

Figure 3:
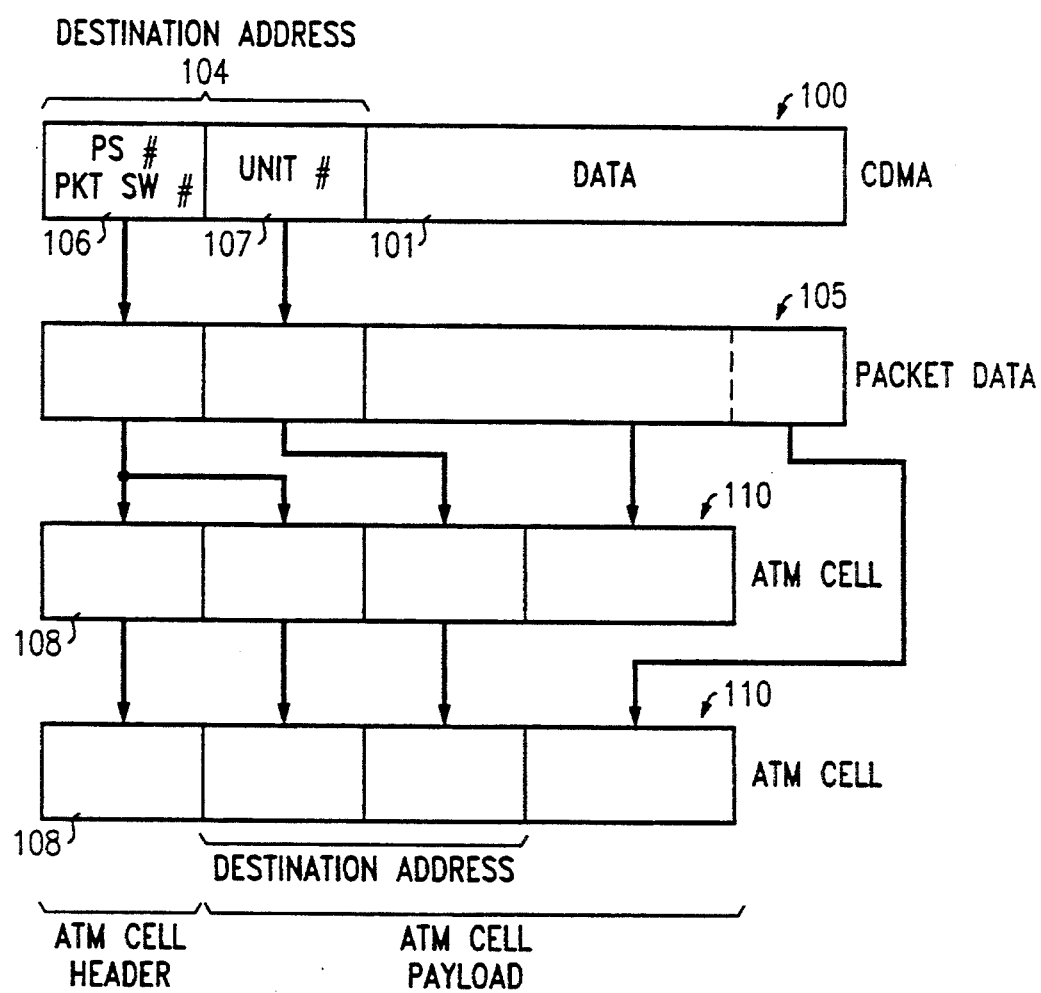
FIG. 3 is a block diagram of a packet addressing system according to one aspect of this invention.

FIG. 3 is a block diagram of a packet addressing system according to an exemplary embodiment of this invention as applied to the embodiment of FIGS. 1 and 2. Packet 100 comprises an electronic data packet as it is generated at the CDMA cell site. Packet 100 includes a destination address 104 and a data portion 101 for the CDMA packet. Destination address 104 comprises two fields, a destination packet switch number, also called packet community, and a unit number 106 designating an end-point within the packet community. This address is assigned during call set up and propagated by ECP 6 throughout the cellular system as mobile 44 (FIG. 1) moves from cell to cell, as described above.

In the embodiment of FIG. 1, cell site 14 adds whatever protocol is required by the packet community, if any, transforming CDMA data packet 100 into packet data 105 (FIG. 3). In this example, packet switch number field 106 is the number of packet switch community 24; unit number field 107 is for the end point speech handler 36.

Cell site 14 then encapsulates packet 105 into one or more ATM cells 110. This may include breaking the data into multiple parts according to the size of an ATM payload if the data portion 101 is too long for one ATM cell 110, as in this example. Cell site 14 then places the community address field into the ATM cell header 108 of ATM cell 110.

After cell site 14 delivers ATM cells 110 to ATM network 22, ATM network delivers ATM cell to PAI 32; PAI 32, removes the ATM transport layer to reassemble the data into packets 105 and send it on bus 40. Speech handler 36 recognizes its destination end point number and its packet community number and receives packet 105. In this manner, packetized data may be sent throughout a connectionless transport system without delaying the initial packets. Furthermore, routing information does not have to be stored in every node handling the packet.

Figure 4:
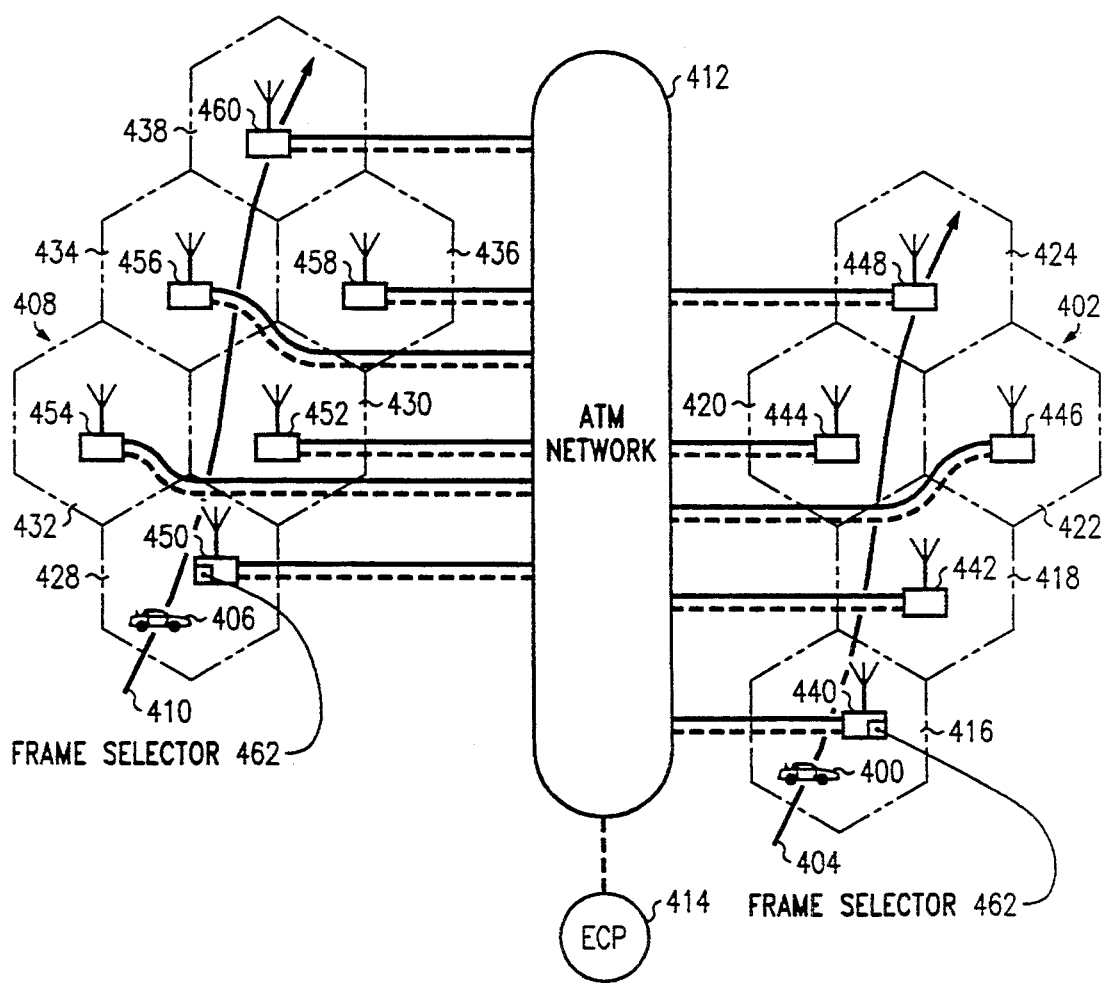
FIG. 4 is an illustration of a mobile-to-mobile call according to an exemplary embodiment of this invention.

Turning now to FIG. 4, an exemplary embodiment of a mobile-to-mobile call according to this invention is described. FIG. 4 shows a mobile telephone 400 traversing a first cellular system 402 via path 404. In this example, mobile 400 places a call to mobile 406 Which is traversing a second cellular system 408 via path 410. All of the cells in both cellular systems 402 and 408 are connected to ATM network 412. ATM network 412 is also connected to executive call processor (ECP) network 414 via the dashed lines. ECP network 414 keeps track of all calls in its associated cellular systems 402 and 408, and further knows the ATM destination address of each cell site. Cellular system 402 comprises a plurality of cells 416–424 and cellular system 408 comprises cells 428–438. Within each cell 416–424 and 428–438 is a cell site 440–448 and 450–460 respectively, which process calls. In each cell site is a frame selector 462 which, as will be described more fully below, keeps track of the calls for mobiles located within radio range of that cell site.

As mobile 400 traverses cellular system 402 via path 404, it initiates a mobile-to-mobile call to mobile 406, starting in cell 416. Cell site 440 in cell 416 reports the call origination to ECP 414, which stores the data, recognizes that the call is to another mobile, and locates mobile 406 in cell 428. Data regarding the call is sent to cell sites 440 and 450, and stored in frame selectors 462 associated with the respective cell sites (in this example 440 and 450). The data includes the ATM destination address of the other cell site connected with the call. As signals arrives at cell site 440 from mobile 400 they are packetized and the unique two-part address of cell site 450 is added, as described above in connection with FIG. 3. The packets are then repacketized, put into the payload of an ATM cell, the ATM address of cell site 460 is added and the packet is sent through ATM network 412 to cell site 460. At cell site 460., the packets are removed from the ATM cell, translated into the CDMA spread spectrum signal and broadcast to mobile 406. Likewise, CDMA signals from mobile 406 are received via the spread spectrum at cell site 450, the contents of which are translated into electronic data, placed into ATM cells which are given the ATM address of cell site 440 and sent via ATM network 412 to cell site 440 where they are formatted and translated into the CDMA spread spectrum signal and broadcast to mobile 400. In this manner, the subrate 8 KHz signal of CDMA is not translated into the 64 KHz PCM and back into CDMA packets as described above in connection with switched calls, thereby avoiding multiple translations into and out of different formats, and thus preserving signal quality while using fewer network resources.

A soft handoff of mobile 400 as it moves from cell site 416 to cell site 418 will now be described. As mobile 400 traverses to cellular system 402 along path 404, it eventually reaches the boundary between cell site 416 and cell site 418. As is known in the art (according to the CDMA references cited above), mobile 400 senses a pilot signal given out by cell site 442 and monitors its signal strength. When the signal strength reaches a predetermined threshold, mobile 400 sends an identification message to cell site 442 and requests a handoff, which begins a handoff transition period. Cell site 442 requests the call information regarding mobile 406 from ECP 414. ECP 414 delivers the ATM address of the destination cell site for mobile 406, which is cell site 450, to cell site 442. Cell site 442 then begins sending the content of the CDMA spread spectrum signal from mobile 400 to cell site 450.

Cell site 450 receives transmissions of ATM cells from both cell site 440 and cell site 442 at frame selector 462. Frame selector 462 then selects the cell with the strongest signal (signal strength having been previously encoded in the CDMA signal, as described in the references cited above), determines which signal is stronger and delivers that packet to the transmitter of cell site 428 for transmission to mobile 406. Upon receiving ATM destination information about new cell site 418 from ECP 414, frame selector 462 in cell site 450 updates its own destination list so that it sends signal data from mobile 406 to both cell site 440 and cell site 442. This dual destination situation remains throughout the soft handoff transition. Thereafter, when the signal strength from cell site 440 falls below a threshold, cell site 440 ceases sending ATM signals to cell site 450. Eventually, ECP 414 deletes cell site 440 from its list of destinations and from the list of destinations in cell site 450, which ends the handoff transition period.

During the handoff transition period for mobile 400 moving from cell 416 to cell 418, mobile 406 may likewise be approaching the boundary between cell site 428 and cell site 430. Mobile 406 senses a pilot signal given out by cell site 430 and, when the signal strength reaches a predetermined threshold, mobile 406 sends an identification message to cell site 430 and requests a handoff. Cell 430 requests the call information regarding mobile 400 from ECP 414. ECP 414 delivers the ATM address of both destination cell sites which, at this point, comprise cell sites 440 and 442. ECP 414 also updates the tables of cell sites 440 and 442 to add the ATM address of cell site 430. Cell sites 440 and 428 now begin to send their packets to both cells 428 and 430. Finally, both cell sites 450 and 452 are sending packets to cell sites 440 and 442, and likewise, cells 440 and 442 are sending packets to cell sites 450 and 452.

Figure 5:
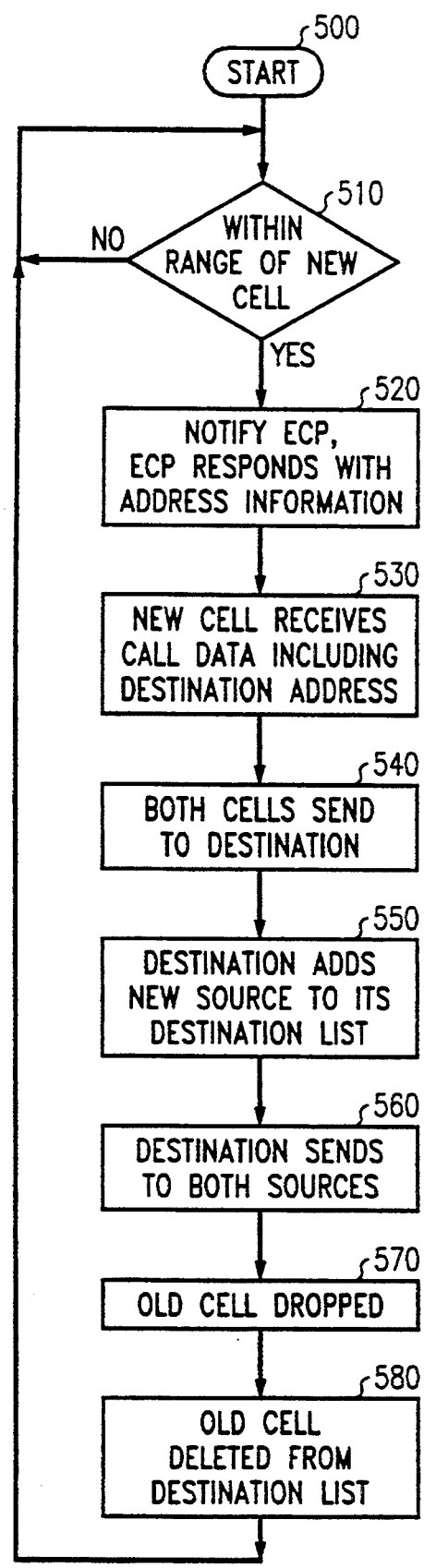
FIG. 5 is a flow chart describing the steps of a soft handoff for a mobile-to-mobile call according to an exemplary embodiment of this invention.

Turning now to FIG. 5, a flow chart describing the soft handoff scenario is shown. This flow chart starts in circle 500 after the call has initially been completely set up. In decision diamond 510, a determination is made whether the mobile is within the range of a new cell. If the mobile is not in range of a new cell, then processing returns back to decision diamond 510. If, in decision diamond 510, it is determined that the mobile is within the range of the new cell, then processing continues to box 520 where the ECP is notified. The ECP responds by sending the call data, including the ATM address, to the new cell site.

In box 530, the new cell receives the call data from the ECP, including the address of the destination, then, in box 540, both cells begin transmitting received CDMA spread spectrum signals to the destination cell (or cells if the destination mobile is also in a soft handoff transition). Processing continues to box 550 where the destination cell adds a new source address for the new cell to its destination list, responsive to receiving call data comprising the new cell's destination address from the ECP. Next, in box 560, destination sends signals it receives from its mobile to both sources. Eventually, the old cell is dropped at the source as shown in box 570 and the old cell is deleted from the destination list in box 580. Processing then returns to decision diamond 510 where checks are then made to determine if the mobile is within range of a new cell. In this manner, soft handoffs may be achieved without tearing down and setting up a circuit switch connection between cell sites (or MTSOs connected to the cell sites). Advantageously, no discernible discontinuities are present in the communications between mobile 400 and mobile 406.

It is to be understood that the above-described embodiment is merely an illustrative principle of the invention and that many variations may be devised by those skilled in the art without departing from the scope of the invention. It is, therefore, intended that such variations be included within the scope of the claims.

We claim:

1. An improvement for the telephone network, said telephone network comprising a plurality of connection-based networks and a plurality of cellular communications networks, each of said cellular communications networks comprising a plurality of cell sites that communicate with a plurality of mobile units via radio signals, said cell sites converting data received in said radio signals into electronic data and convening electronic data into said radio signals, each of said connection-based networks having a plurality of delivery points which function to translate from said electronic data into a form used by said connection-based network and from said form used by said connection-based network into said electronic data, said improvement comprising:

a single, high speed packet network, said high speed packet network having connections to each of said plurality of cell sites and each of said delivery points;

means at each of said cell sites for packetizing said electronic data for transmission by said high speed packet network, for transmitting and receiving said packetized communications on said high speed packet network, for depacketizing said electronic data, and for converting said depacketized electronic data into said radio signals; and means at each of said delivery points for receiving and transmitting said packetized communications from said high speed packet network, for depacketizing said packetized communications into unpacketized communications and for translating said packetized communications into a format used by said connection-based network, wherein said high speed packet network delivers said unpacketized communications to any delivery point connected to said high speed packet network.

2. The improvement of claim 1 wherein said high speed packet network comprises an asynchronous transfer mode (ATM) network.

3. The improvement of claim 1 wherein said radio signals comprise code-division multiple access (CDMA) communications, and wherein said means at each of said delivery points for translating comprises means for translating said CDMA communications into digital data used by a public switched telephone network.

4. The improvement of claim 2 wherein said ATM network transmits ATM packets, each of said ATM packets having a payload, and wherein said means at each of said cell sites for packetizing said electronic data comprises means for receiving said electronic data and placing them into said payload of said ATM packets.

5. The improvement of claim 4 wherein said means for depacketizing comprises means for removing said packetized communications from said payload of said ATM packets.

6. The improvement of claim 1 wherein said means at each of said cell sites for receiving and depacketizing data receives data from both a delivery point in a connection-based network and from another cell site.

7. A method for transmitting cellular communications between a cell site and a public switched telephone network, said network including a delivery point for translating said cellular communications which are in a form used by cellular radio transmission into and out of a form used by said public switched telephone network, said cell site being in communication with one or more cellular devices via said radio transmission, said cell site and said delivery point being connected to a high speed packet network, said method comprising:

receiving radio signals from said cellular devices at said cell site;

said cell site embedding a communications content of said radio signals in packets transmitted by said high speed packet network and transmitting said packets on said high speed packet network;

said delivery point receiving ones of said packets, removing said embedded communications content from said packets, translating said cellular communications into a form used by said public switched telephone network, and delivering said translated cellular communications to said public switched telephone network.

8. The method of claim 7 wherein said high speed packet network comprises an ATM network, said ATM network transmitting ATM packets comprising a header and a payload, when said step of embedding said communications content in a packet comprises breaking said cellular communications into portions that are the size of said ATM packet payload and placing each of said portions into said ATM packet payloads.

9. The method of claim 8 wherein said step of removing said embedded communications content comprises removing each of said portions of said communications content from said payload of said ATM packets and reassembling said portions into said cellular communications.

10. The method of claim 7 wherein said cellular communications comprise CDMA data packets, and wherein said step of translating said cellular communications comprises translating said CDMA data packets into data packets used by said public switched telephone network.

11. A method for transmitting cellular radio signals between a first and a second cell site for a call from a first cellular device to a second cellular device without converting said call into a form used by a connection-based telephone network, said first and second cell sites having a connection to a high speed packet network, said method comprising:

receiving said radio signals from said first cellular device at said first cell site, said radio signals including a communication content;

translating said communication content into electronic data;

said first cell site embedding said electronic data into a packet and transmitting said packet to said second cell site on said high speed packet network;

said second cell site receiving said packetized electronic data, removing said electronic data from said packet, translating said electronic data into said radio signals, and transmitting said radio signals to said second cellular device.

12. The method of claim 11 wherein said high speed packet network comprises an ATM network, said ATM network transmitting ATM packets, said ATM packets comprising a header and a payload, said step of embedding said electronic data into a packet comprising disassembling said electronic data into portions that are the size of said ATM packet payload and placing each of said portions into said ATM packet payloads.

13. The method of claim 12 wherein said step of removing said embedded content comprises removing each of said portions of said electronic data from said payload of said ATM packets and reassembling said portions into said radio signals.

14. A system for transmitting cellular radio signals between a first and a second cell site for a call from a first cellular device to a second cellular device without converting said call into a form used by a connection-based telephone network, said first and second cell sites connected to a high-speed packet network, said system comprising:

means for receiving radio signals from said first cellular device at said first cell site, said radio signals including a communications content;

means at said first cell site for translating said communications content of said radio signals into electronic data, for embedding said electronic data into a packet and for transmitting said packet to said second cell site on said high speed packet network; and means at said second cell site for receiving said packetized electronic data, for removing said electronic data from said packet, for translating said electronic data into said communications content of said radio signals and for transmitting said communications content of said radio signals to said second cellular device.

\* \* \* \* \*

UNITED STATES PATENT AND TRADEMARK OFFICE
CERTIFICATE OF CORRECTION

PATENT NO. : 5,434,854
DATED : July 18, 1995
INVENTOR(S) : J. P. Focarile, J. G. Hemmady, R. A. Spanke, H-C Yu It is certified that error appears in the above-indentified patent and that said Letters Patent is hereby corrected as shown below:

Column 10, line 27: "convening" should be --converting--.

Signed and Sealed this

Third Day of October, 1995

*Attest:*

BRUCE LEHMAN

*Attesting Officer*     *Commissioner of Patents and Trademarks*